US012494611B1

(12) United States Patent
Zhang

(10) Patent No.: US 12,494,611 B1
(45) Date of Patent: Dec. 9, 2025

(54) ROTATION MEMBER PREVENTED FROM BEING ENTANGLED, AND JIGSAW PUZZLE TABLE

(71) Applicant: Meng Zhang, Guangdong (CN)

(72) Inventor: Meng Zhang, Guangdong (CN)

( * ) Notice: Subject to any disclaimer, the term of this patent is extended or adjusted under 35 U.S.C. 154(b) by 0 days.

(21) Appl. No.: 19/037,343

(22) Filed: Jan. 27, 2025

(30) Foreign Application Priority Data

Jan. 24, 2025 (CN) ......................... 202520172052.0

(51) Int. Cl.
*A63F 9/10* (2006.01)
*A47B 11/00* (2006.01)
*H01R 39/64* (2006.01)
*F21V 21/088* (2006.01)

(52) U.S. Cl.
CPC .............. *H01R 39/64* (2013.01); *A47B 11/00* (2013.01); *A63F 9/1044* (2013.01); *F21V 21/0885* (2013.01)

(58) Field of Classification Search
CPC . A47B 11/00; A47B 2063/005; A63F 9/0811; A63F 9/1044; H01R 39/64; F21V 21/0885
See application file for complete search history.

(56) References Cited

U.S. PATENT DOCUMENTS

2023/0390633 A1* 12/2023 Che ....................... A63F 9/1044
2024/0113456 A1* 4/2024 Zeng .................. H01R 12/7088

FOREIGN PATENT DOCUMENTS

CN 106690840 A * 5/2017

* cited by examiner

*Primary Examiner* — Matthew W Ing

(57) ABSTRACT

A rotation member includes: a base and a rotation element rotatably mounted on the base; a first cable assembly, a second cable assembly, and an electrical conductive assembly. The first cable assembly is mounted on the rotation element and connected to an electric device; the second cable assembly is mounted on the base and connected to an external power supply source. The electrical conductive assembly includes an electrical conductive terminal and an electrical conductive member electrically connected to the electrical conductive terminal; when the rotation element rotates, the electrical conductive terminal performs a circular motion on the electrical conductive member, and a center of the circular motion coincides with a rotation center of the rotation element; the electrical conductive terminal is electrically connected to one of the first cable assembly and the second cable assembly, and the electrical conductive member is electrically connected to the other one thereof.

18 Claims, 18 Drawing Sheets

ROTATION MEMBER PREVENTED FROM BEING ENTANGLED, AND JIGSAW PUZZLE TABLE

CROSS REFERENCE TO RELATED APPLICATIONS

The present application claims the priority of Chinese patent application No. 202520172052.0, filed on Jan. 24, 2025, contents of which are incorporated herein by its entireties.

FIELD

The present disclosure relates to the field of articles for jigsaw puzzle tools, and particularly to a rotation member that is prevented from being entangled by cables, and a jigsaw puzzle table.

BACKGROUND

As rotatable table tops are widely used, many rotation members are arranged with cable wires therein, and the cable wires are connected to a power supply and an electrical device. In this way, additional functions can be provided, however, when the rotation member is rotating, entanglement caused by the cable wires may occur.

SUMMARY

The present disclosure provides a rotation member prevented from being entangled, including: a base and a rotation element rotatably mounted on the base; a first cable assembly, a second cable assembly, and an electrical conductive assembly. The first cable assembly is mounted on the rotation element to be connected to an electric device; the second cable assembly is mounted on the base to be connected to an external power supply source. The electrical conductive assembly comprises an electrical conductive terminal and an electrical conductive member electrically connected to the electrical conductive terminal; when the rotation element rotates relative to the base, the electrical conductive terminal is configured to perform a circular motion on the electrical conductive member, and a center of the circular motion coincides with a rotation center of the rotation element; the electrical conductive terminal is electrically connected to one of the first cable assembly and the second cable assembly, and the electrical conductive member is electrically connected to the other one of the first cable assembly and the second cable assembly.

The present disclosure further provides a jigsaw puzzle table, including: a table body; an electric device, connected to the table body; and the above-described rotation member. While in use, the table body is arranged on the rotation member and is configured to rotate as the rotation member rotates.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

REFERENCE NUMERALS IN THE DRAWINGS

Figure 1:
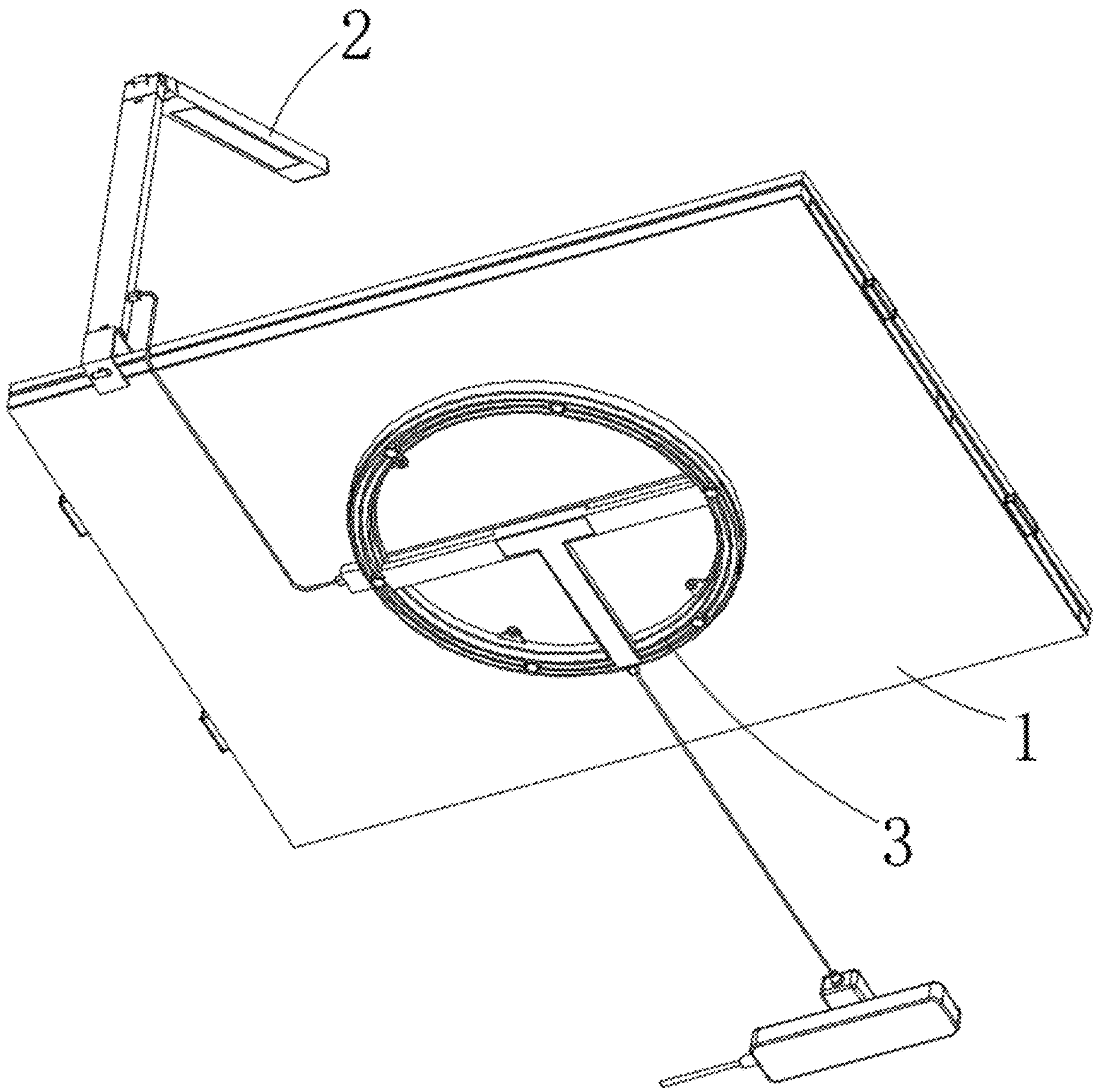
FIG. 1 is a structural schematic view of a jigsaw puzzle table according to an embodiment of the present disclosure.

1, table body; 11, upper table board; 12, lower table board; 13, frame; 14, drawer;

2, electric device; 21, mounting member; 211, upper edge; 212, lower edge; 213, first bolt; 214, second bolt; 22, support arm; 23, light emitting member body; 3, rotation member; 30, ball bearing;

31, base; 311, slot; 3111, second through hole; 312, second wire slot; 313, cover; 314, second connection port;

32, rotation element; 321, first through hole; 322, first wire slot; 3221, extension portion; 32211, mounting cavity; 32212, first connection port;

33, first cable assembly; 331, first wire; 332, first circuit board; 333, first adapter wire; 334, third circuit board;

34, second cable assembly; 341, second conductor; 342, second circuit board; 343, connection terminal;

35, electrical conductive assembly; 351, electrical conductive terminal; 3511, positive-electrode conductive terminal; 3512, negative-electrode conductive terminal; 352, electrical conductive member; 3521, positive-electrode conductive member; 3522, negative-electrode conductive member.

DETAILED DESCRIPTION

Unless otherwise defined, all technical and scientific terms used herein have the same meaning as commonly understood by those skilled in the art to which this disclosure belongs. The terms used in the description of the application herein are intended for describing particular embodiments only and are not intended to limit the present disclosure. In the description, claims, and the above drawings of the present disclosure, the terms "comprising" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in connection with an embodiment may be included in at least one embodiment of the present disclosure. The appearance of the phrase at various places in the specification does not necessarily refer to the same embodiment, nor is it a separate or alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

As shown in FIGS. 1 to 4, the present disclosure provides a rotation member 3 which is prevented from being entangled by cables. The rotation member 3 includes the following.

A base 31 and a rotation element 32 are arranged. The rotation element 32 is rotatably mounted on the base 31.

A first cable assembly 33, a second cable assembly 34, and an electrical conductive assembly 35 are arranged. The first cable assembly 33 is mounted on the rotation element 32 to be connected to an electric device 2. The second cable assembly 34 is mounted on the base 31 to be connected to an external power supply source. The electrical conductive assembly 35 includes an electrical conductive terminal 351 and an electrical conductive member 352 electrically connected to the electrical conductive terminal 351. When the rotation element 32 rotates relative to the base 31, the electrical conductive terminal 351 performs a circular motion on the electrical conductive member 352, and a center of the circular motion coincides with a rotation center of the rotation element 32. The electrical conductive terminal 351 is electrically connected to one of the first cable assembly 33 and the second cable assembly 34, and the electrical conductive member 352 is electrically connected to the other one of the first cable assembly 33 and the second cable assembly 34.

Figure 2:
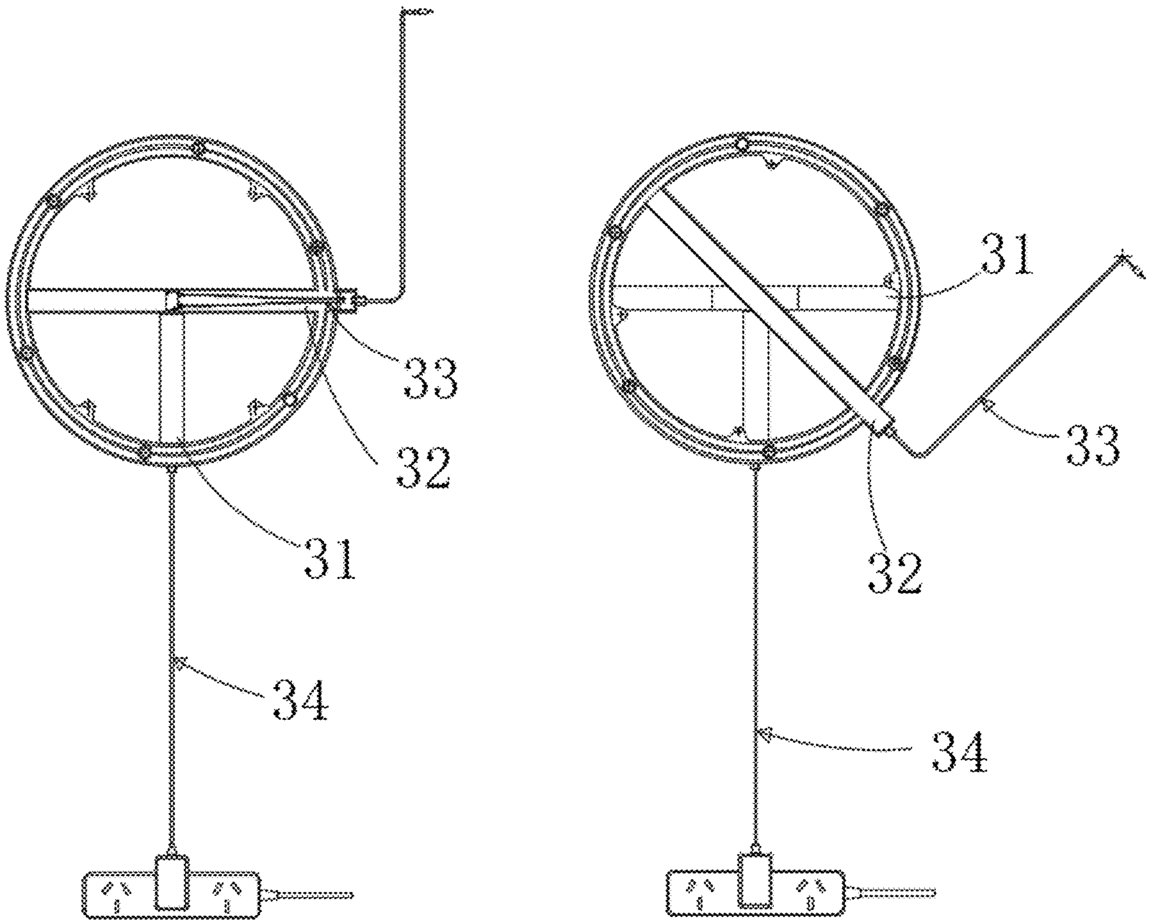
FIG. 2 is a structural schematic view showing two rotations states of a rotation member according to an embodiment of the present disclosure.
Figure 3:
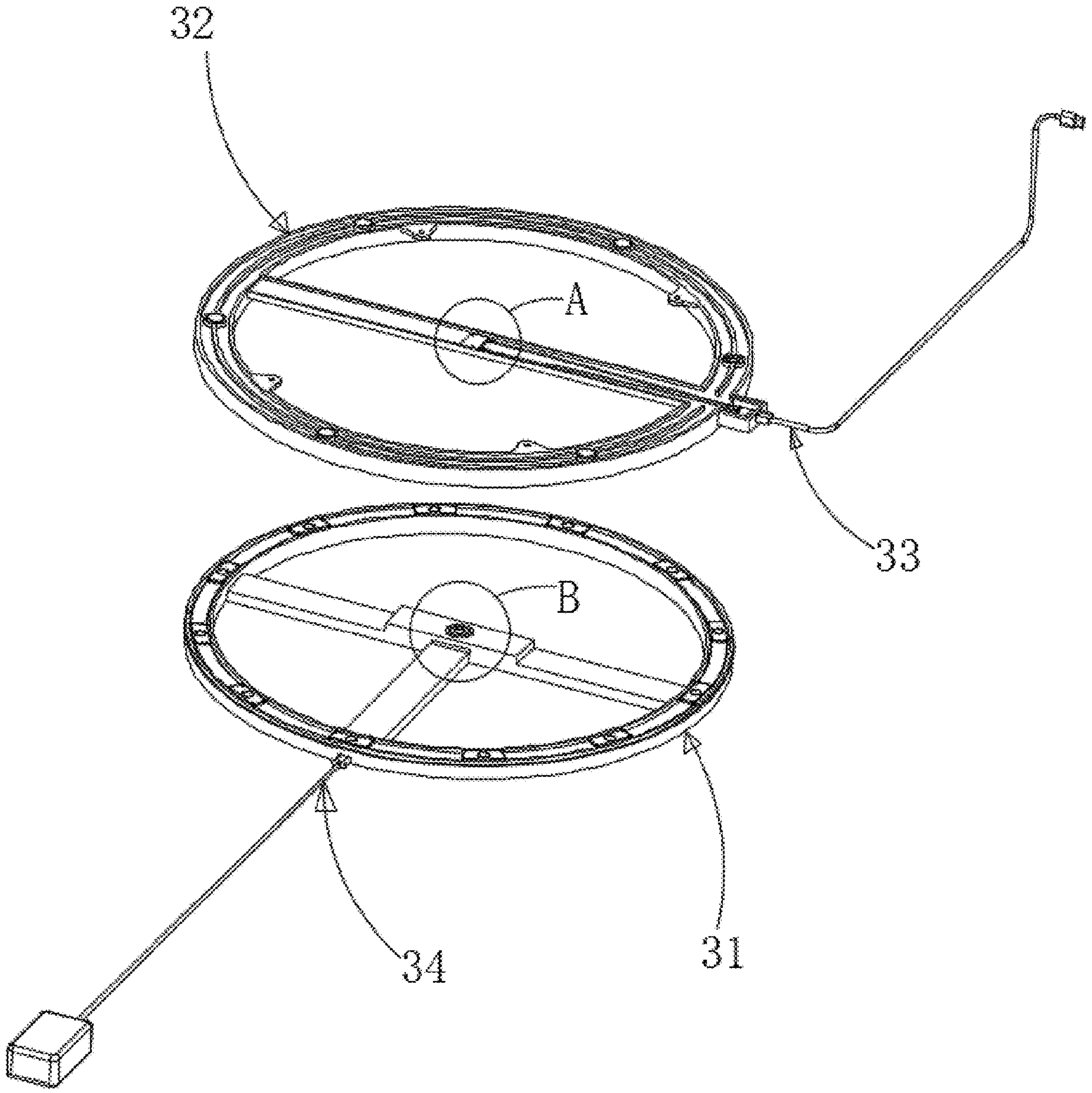
FIG. 3 is an exploded view of the rotation member according to an embodiment of the present disclosure.
Figure 4:
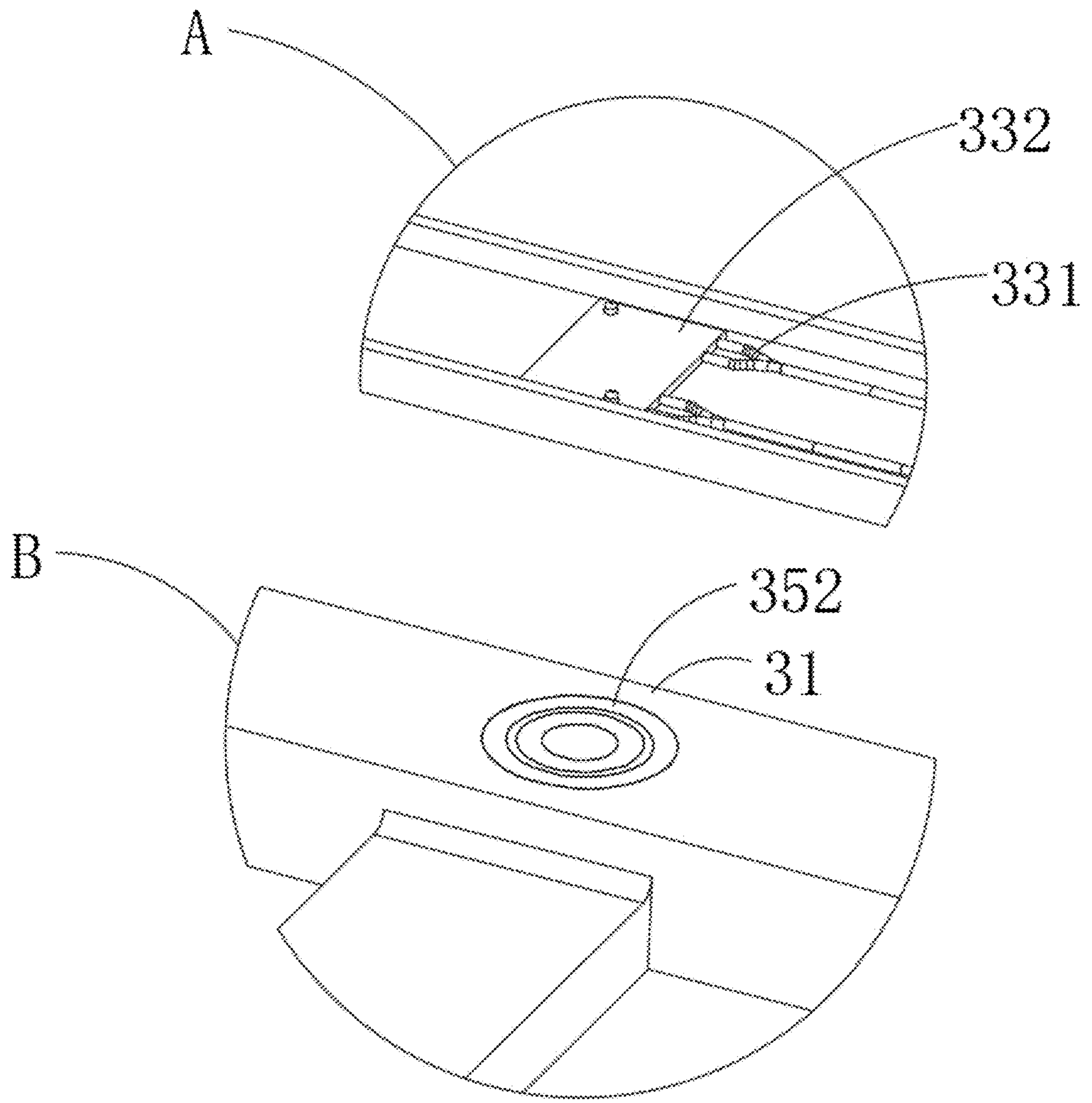
FIG. 4 is an enlarged view of a portion A and a portion B shown in FIG. 3.
Figure 7:
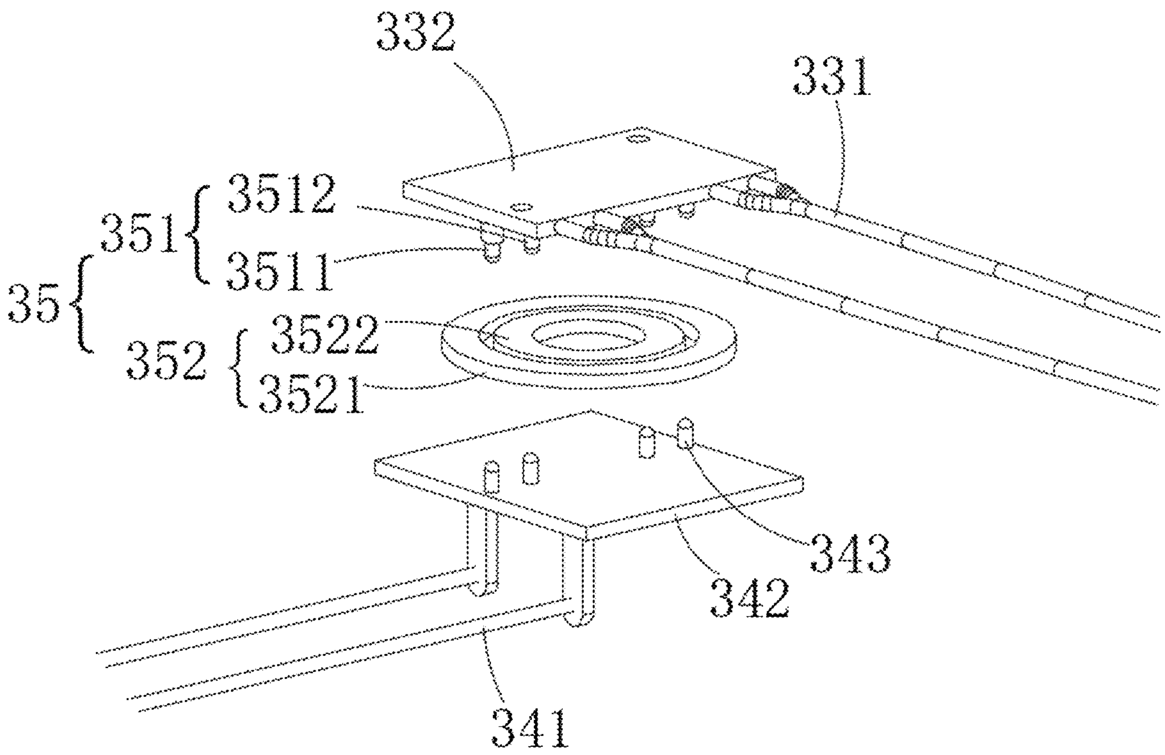
FIG. 7 is a structural schematic view of an electrical conductive assembly according to an embodiment of the present disclosure.

As shown in FIG. 2 and FIG. 7, in order to prevent entanglement of wires arranged inside the rotation member 3 during rotation, in the present embodiment, electrical connection is formed between the first cable assembly 33, the second cable assembly 34 and the electrical conductive assembly 35, and connection based on a single wire in the art is omitted. The first cable assembly 33 and the second cable assembly 34 are mounted on the rotation element 32 and the base 31, respectively. The electrical conductive assembly 35 achieves the electrical connection between the first cable assembly 33 and the second cable assembly 34. Specifically, the electrical conductive assembly 35 includes the electrical conductive terminal 351 and the conductive member 352. The electrical conductive member 352 provides a contact surface, and the electrical conductive terminal 351 serves as a contact point to be in contact with the contact surface of the electrical conductive member 352. In this way, during rotating, the electrical conductive terminal 351 performs the circular motion on the electrical conductive member 352, and a trajectory of the circular motion is located in the electrical conductive member 352. In this way, wires are driven to be moved by the rotation element 32 without affecting constant electrical connection, such that entanglement caused by wires is avoided.

The electrical conductive terminal 351 and the electrical conductive member 352 are made of metal having good electrical conductivity and wear resistance, such as copper, copper alloy, silver, silver alloy, silver-plated copper, gold-plated copper, and so on, such that stable electrical conductivity during contact is ensured.

Figure 5:
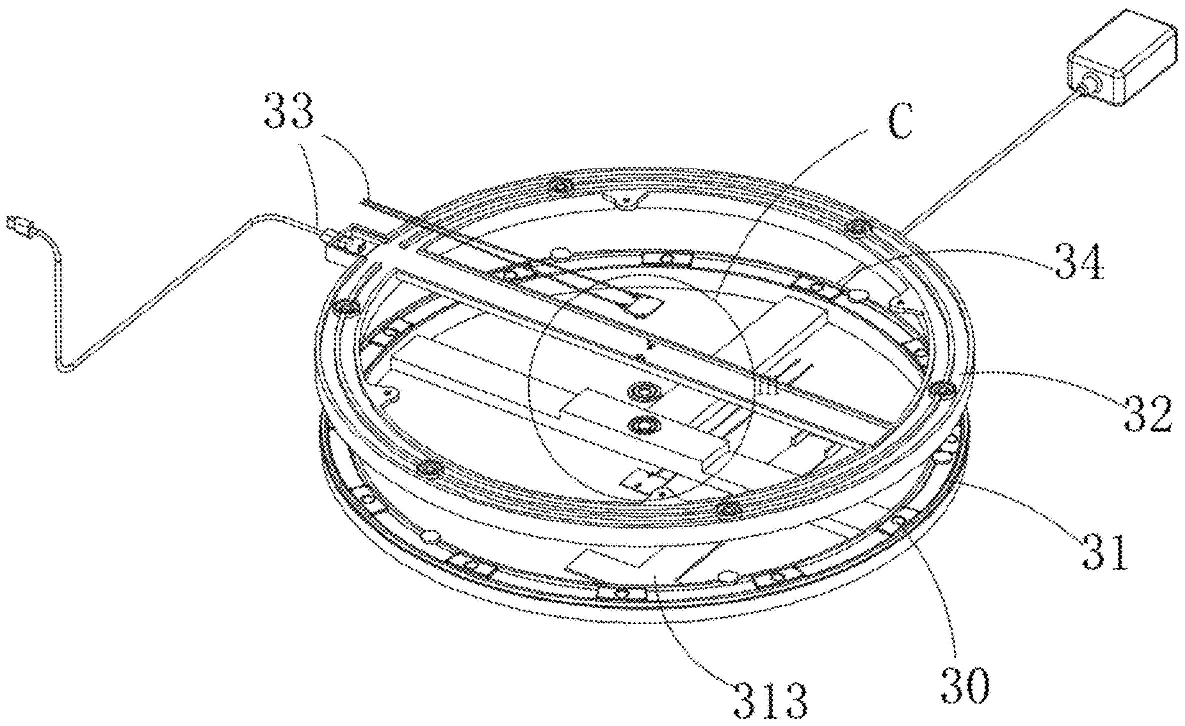
FIG. 5 is an exploded view of the rotation member shown in FIG. 3.
Figure 6:
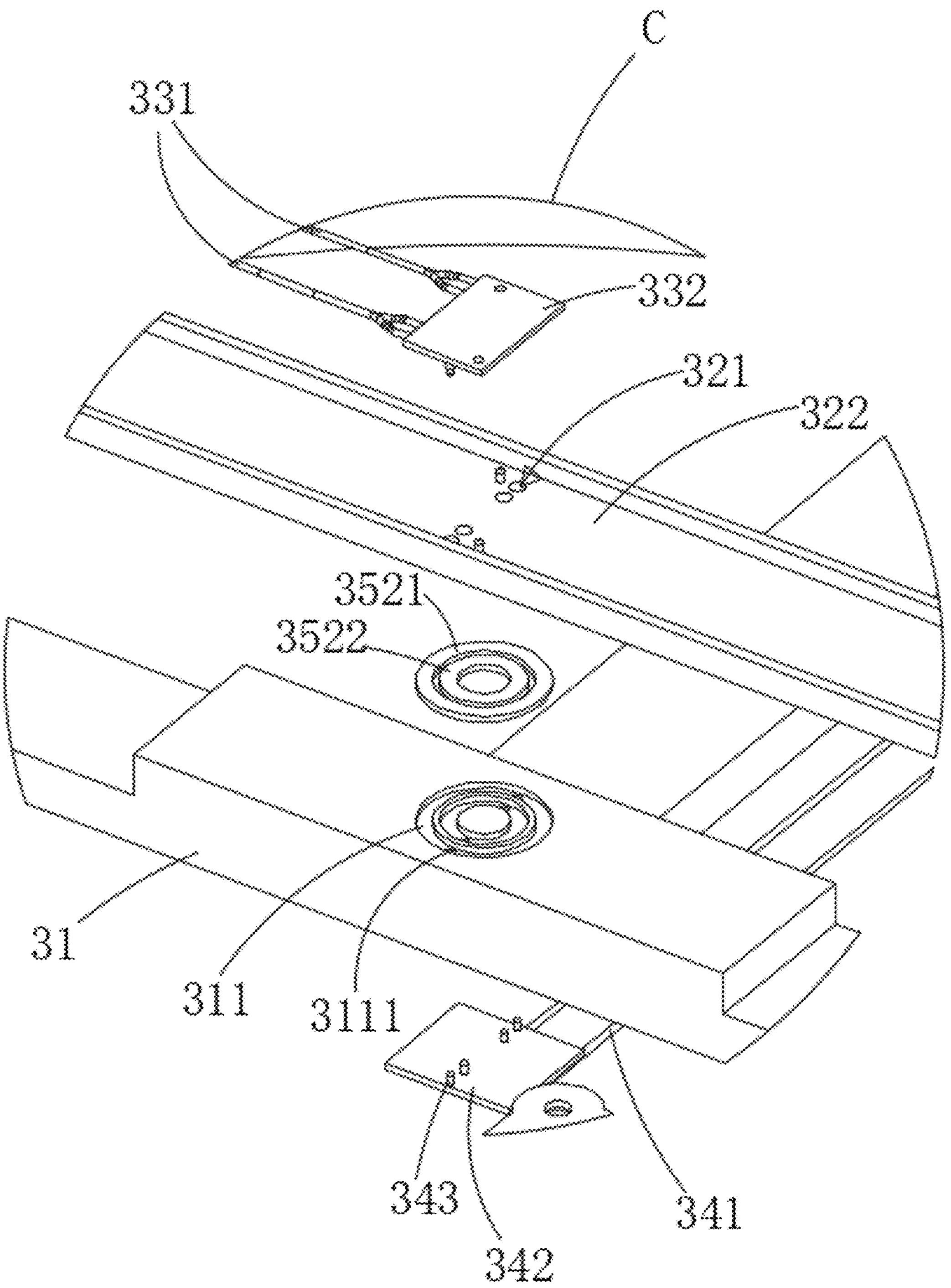
FIG. 6 is an enlarged view of a portion C shown in FIG. 5.

Further, as shown in FIGS. 5 and 6, the first cable assembly 33 includes a first wire 331 and a first circuit board 332. Two ends of the first wire 331 are respectively electrically connected to the electric device 2 and the first circuit board 332. The electrical conductive terminal 351 is electrically connected to the first circuit board 332.

As shown in FIG. 7, in an embodiment, the electrical conductive terminal 351 includes a pin arranged on the first circuit board 332. The first circuit board 332 is fixedly arranged on the rotation element 32. The fixation can be achieved in various manners, such as by adhesive bonding, by clamping, by snapping, or by an embedded structure. In this way, the first circuit board 332 is maintained at a position stably while the rotation element 32 is rotating, such that contact between the electrical conductive terminal 351 and the electrical conductive member 352 is reliable.

Further, as shown in FIGS. 6 and 7, the second cable assembly 34 includes a second wire 341, a second circuit board 342, and a connection terminal 343. Two ends of the second wire 341 are electrically connected to the external power supply source and the second circuit board 342, respectively. An end of the connection terminal 343 is electrically connected to the second circuit board 342, and the other end of the connection terminal 343 is electrically connected to the electrical conductive member 352.

Alternatively, in other embodiments, the electrical conductive terminal 351 may be fixedly placed on the base 31, accordingly the electrical conductive member 352 can be fixedly placed on the rotation element 32. Alternatively, in other embodiments, the first wire 331 may be connected to the external power supply source, accordingly the second wire 341 can be connected to an electric device.

In an embodiment, the connection terminal 343 includes a pin arranged on the second circuit board 342. The connection terminal 343 provides a contact, such as a contact point or a contact surface, between the second circuit board 342 and the electrical conductive member 352 to transfer electrical energy from the external power supply source to the electrical conductive member 352, and ultimately, transfer the electrical energy to the first cable assembly 33 through the electrical conductive terminal 351. In this way, power is supplied to the entire system.

Further, the first circuit board 332 is disposed near the rotation center of the rotation element 32.

A size of the electrical conductive member 352 depends on a size of the trajectory of the circular motion performed by the electrical conductive terminal 351. In order to achieve a more compact circuit arrangement, the first circuit board 332 is preferably disposed near the rotation center of the rotation element 32, such that a radius of the trajectory of the circular motion performed by the electrical conductive terminal 351 is smaller. In this way, the size of the electrical conductive member 352 can be reduced accordingly. In addition, by reducing the size of the electrical conductive member 352, material costs are reduced.

Further, as shown in FIG. 7, the electrical conductive member 352 includes a positive-electrode conductive member 3521 and a negative-electrode conductive member 3522. The positive-electrode conductive member 3521 and the negative-electrode conductive member 3522 are spaced apart from each other.

Accordingly, as shown in FIG. 7, the electrical conductive terminal 351 includes a positive-electrode conductive terminal 3511 and a negative-electrode conductive terminal 3512. The positive-electrode conductive terminal 3511 and the negative-electrode conductive terminal 3512 are spaced apart from each other.

In an embodiment, the first wire 331 includes a positive-electrode wire and a negative-electrode wire in accordance with a positive electrode and a negative electrode. The positive-electrode wire is connected to the positive-electrode conductive terminal 3511. The negative-electrode wire is connected to the negative-electrode conductive terminal 3512. The electrical conductive member 352 includes the positive-electrode conductive member 3521 and the negative-electrode conductive member 3522. The positive-electrode conductive terminal 3511 is electrically connected to the positive-electrode conductive member 3521. The negative-electrode conductive terminal 3512 is electrically connected to the negative-electrode conductive member 3522. Similarly, the second wire 341 includes a positive-electrode wire and a negative-electrode wire. The positive-electrode wire is connected to the positive-electrode connection terminal, and the negative-electrode wire is connected to the negative-electrode connection terminal. In this way, the positive electrode and the negative electrode in the circuit are correctly arranged, preventing circuit failure due to electrode confusion.

In order to ensure that the electrical conductive terminal 351 can stably contact the electrical conductive member 352 during rotating, a plurality of electrical conductive terminals 351 may be arranged. By arranging the plurality of electrical conductive terminals 351, stability of the contact may be improved, and the circuit is particularly suitable for a device that needs to be rotated frequently. Even when one of the plurality of electrical conductive terminals 351 fails due to being worn and torn, vibration, or other factors, the rest of the plurality of electrical conductive terminals 351 still operate normally to maintain conduction of the circuit.

Further, as shown in FIGS. 5 to 7, the electrical conductive terminal 351 includes at least two positive-electrode conductive terminals 3511. The at least two positive-electrode conductive terminals 3511 are centrally-symmetrically distributed about the rotation center of the rotation element 32. The central-symmetrical distribution may balance a centrifugal force, which is generated during rotation, and the contact between the electrical conductive terminal 351 and the electrical conductive member 352 is more stable.

Further, when the electrical conductive terminal 351 performs the circular motion on the electrical conductive member 352, a trajectory of the circular motion of the positive-electrode conductive terminal 3511 and a trajectory of the circular motion of the negative-electrode conductive terminal 3512 form concentric circles. The specific structure of the electrical conductive terminal 351 is not limited, such as bumps with curved end surfaces, pins with a certain longitudinal length, and so on, as long as it can achieve electrical connection with the electrical conductive member 352.

When the positive-electrode conductive terminal 3511 and the negative-electrode conductive terminal 3512 are disposed on a same circumference, the positive-electrode conductive terminal 3511 and the negative-electrode conductive terminal 3512, when contacting the electrical conductive member 352, may cause a short circuit due to positional overlap. Therefore, the positive-electrode conductive terminal 3511 and the negative-electrode conductive terminal 3512 need to be arranged on different circumferences. In an embodiment, the trajectory of the circular motion of the positive-electrode conductive terminal 3511 and the trajectory of the circular motion of the negative-electrode conductive terminal 3512 form concentric circles, such that the positive-electrode conductive terminal 3511 and the negative-electrode conductive terminal 3512 are distributed on different circumferential positions, and therefore, the positive-electrode conductive terminal 3511 and the negative-electrode conductive terminal 3512 do not contact the positive-electrode conductive member 3521 and the negative-electrode conductive member 3522 at the same time.

Further, as shown in FIG. 7, each of the positive-electrode conductive member 3521 and the negative-electrode conductive member 3522 is substantially ring-shaped.

The positive-electrode conductive member 3521 and the positive-electrode conductive member 3522 are preferably annular members having a same circular center. The circular center of the positive-electrode conductive member 3521 and the circular center of the negative-electrode conductive member 3522 are located at a same height of a rotation axis. An inner wall of one of the positive-electrode conductive member 3521 and the positive-electrode conductive member 3522 surrounds an outer wall of the other one of the positive-electrode conductive member 3521 and the positive-electrode conductive member 3522. A gap is formed between the inner wall and the outer wall. The gap is configured to isolate the positive-electrode conductive member 3521 from the negative-electrode conductive member 3522 to avoid the short circuit due to a crossover of a positive electrode current and a negative electrode current.

In an embodiment, one of the positive-electrode conductive member 3521 and the negative-electrode conductive member 3522 is a circular member, and the other one of the positive-electrode conductive member 3521 and the negative-electrode conductive member 3522 is a ring-shaped member. The inner wall of the ring-shaped member surrounds the outer wall of the circular member, and the gap is formed between the ring-shaped member and the circular member.

Figure 8:
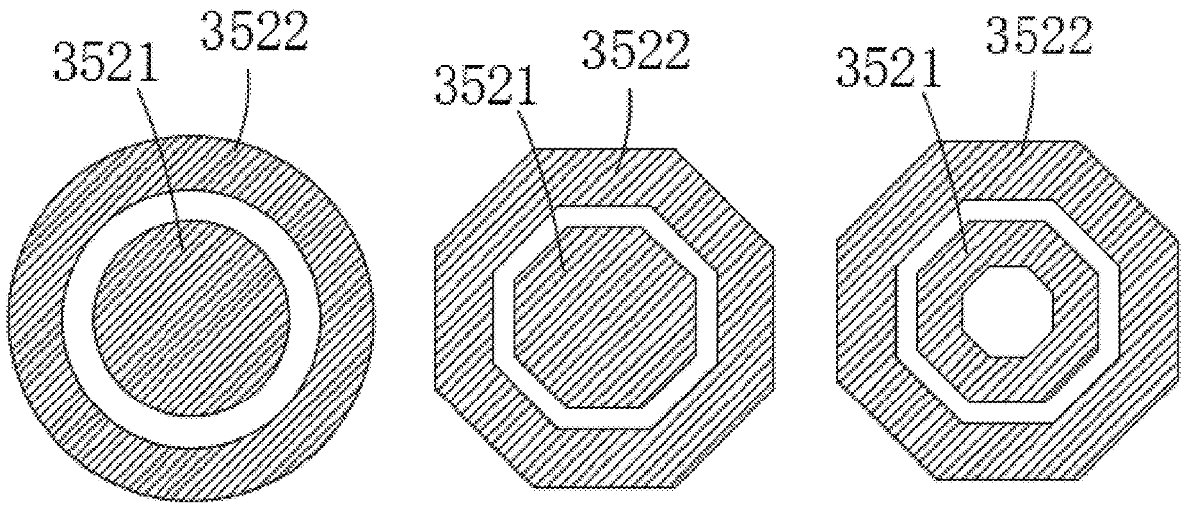
FIG. 8 is a structural schematic view of an electrical conductive member according to an embodiment of the present disclosure.

In other embodiments, as shown in FIG. 8, the positive-electrode conductive member 3521 and the negative-electrode conductive member 3522 may be polygonal or may be a loop having a polygonal contour, such as quadrilateral, pentagonal, hexagonal, octagonal, and so on, as long as the trajectory of the circular motion of the positive-electrode conductive terminal 3511 falls in the positive-electrode conductive member 3521 and the trajectory of the circular motion of the negative-electrode conductive terminal 3512 falls in the negative-electrode conductive member 3522. In this way, stability connection of the positive electrode and the negative electrode is ensured.

Further, as shown in FIG. 6, a side of the rotation element 32 facing the base 31 defines a first through hole 321. The electrical conductive terminal 351 passes through the first through hole 321 and is electrically connected to the electrical conductive member 352. A side of the base 31 facing the rotation element 32 defines a slot 311, and the electrical conductive member 352 is received in the slot 311.

Accordingly, a slot bottom of the slot 311 defines a second through hole 3111. The connection terminal 343 passes through the second through hole 3111 and is electrically connected to the electrical conductive member 352.

In the present disclosure, the electrical conductive member 352 may be mounted in two manners. That is, the electrical conductive member 352 is mounted on the rotation element 32, or the electrical conductive member 352 is mounted on the base 31. The above two mounting manners both ensure that the electrical conductive terminal 351 can be in contact with the electrical conductive member 352 during rotation of the rotation element 32.

As shown in FIG. 6, in an embodiment, the electrical conductive member 352 is mounted in the base 31. The first cable assembly 33 is mounted inside the rotation element 32, and the electrical conductive terminal 351 is exposed from the rotation element 32 through the first through hole 321. The slot 311 is located at a top of the base 31. The electrical conductive member 352 is received in the slot 311. By defining the slot 311, a contact surface between the electrical conductive member 352 and the electrical conductive terminal 351 is completely exposed. In this way, it is ensured that, when the rotation element 32 is rotating, rotation of the electrical conductive terminal 351 with respect to the electrical conductive member 352 is not affected, and the electrical conductive terminal 351 remains in contact with the electrical conductive member 352. The second cable assembly 34 is mounted in the base 31, and the second through hole 3111 is defined in the slot bottom of the slot 311, such that the connection terminal 343 extends out of the base 31 and remains in contact with the electrical conductive member 352.

Further, as shown in FIG. 6, the rotation element 32 defines a first wire slot 322, the first wire 331 and the first circuit board 332 are received in the first wire slot 322, and the first through hole 321 is defined in a slot wall of the first wire slot 322. As shown in FIG. 8, the base 31 defines a second wire slot 312, the second wire 341 and the second circuit board 342 are received in the second wire slot 312, and the second through hole 3111 is defined in a slot wall of the second wire slot 312.

The first wire slot and the second wire slot secure the first wire 331 and the second wire 341 to the rotation element 32 and the base 31, respectively. Wires are prevented from being twisted, stretched, or dislodged in the rotation element 32 or the base 31.

Figure 9:
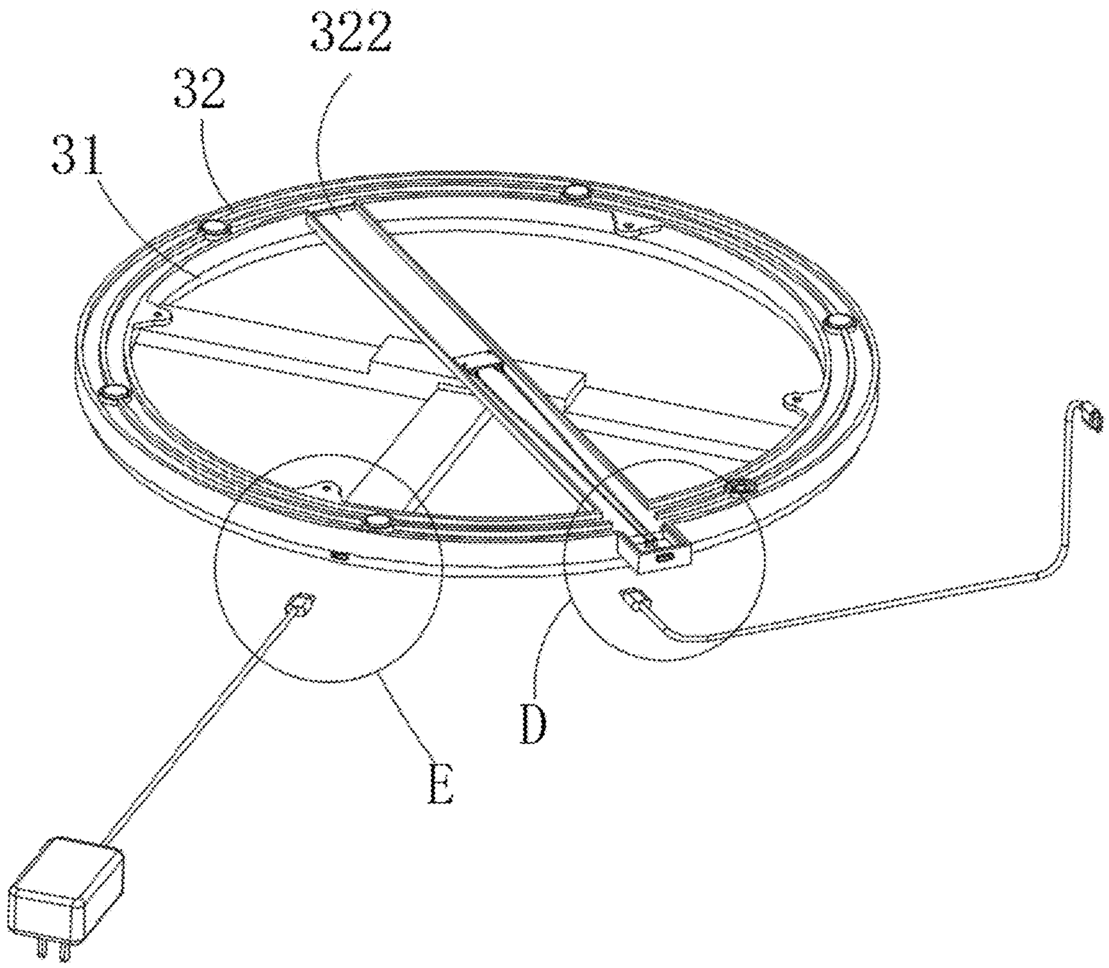
FIG. 9 is a structural schematic view of the rotation member, being viewed from a viewing angle, according to an embodiment of the present disclosure.
Figure 10:
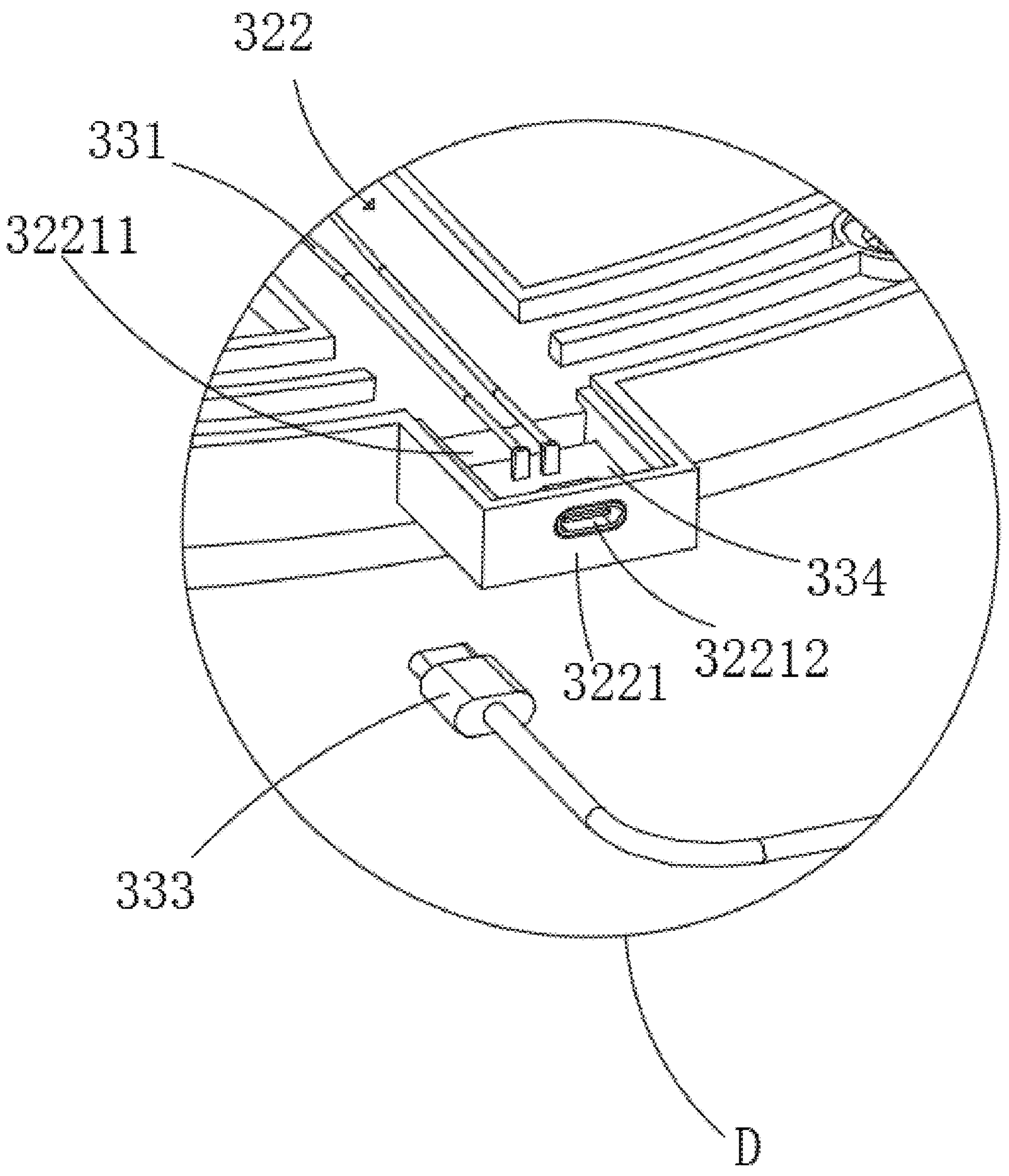
FIG. 10 is an enlarged view of a portion D shown in FIG. 9.

Further, as shown in FIGS. 9 and 10, the first cable assembly 33 further includes a third circuit board 334, the third circuit board 334 is electrically connected to the first wire 331. An end of the first wire slot 322 away from the rotation center defines a mounting cavity 32211. The third circuit board 334 is received in the mounting cavity 32211. A first connection port 32212 is defined in an outer edge of the mounting cavity 32211. The electrical device 2 is electrically connected to the first cable assembly 33 through the first connection port 32212.

Figure 11:
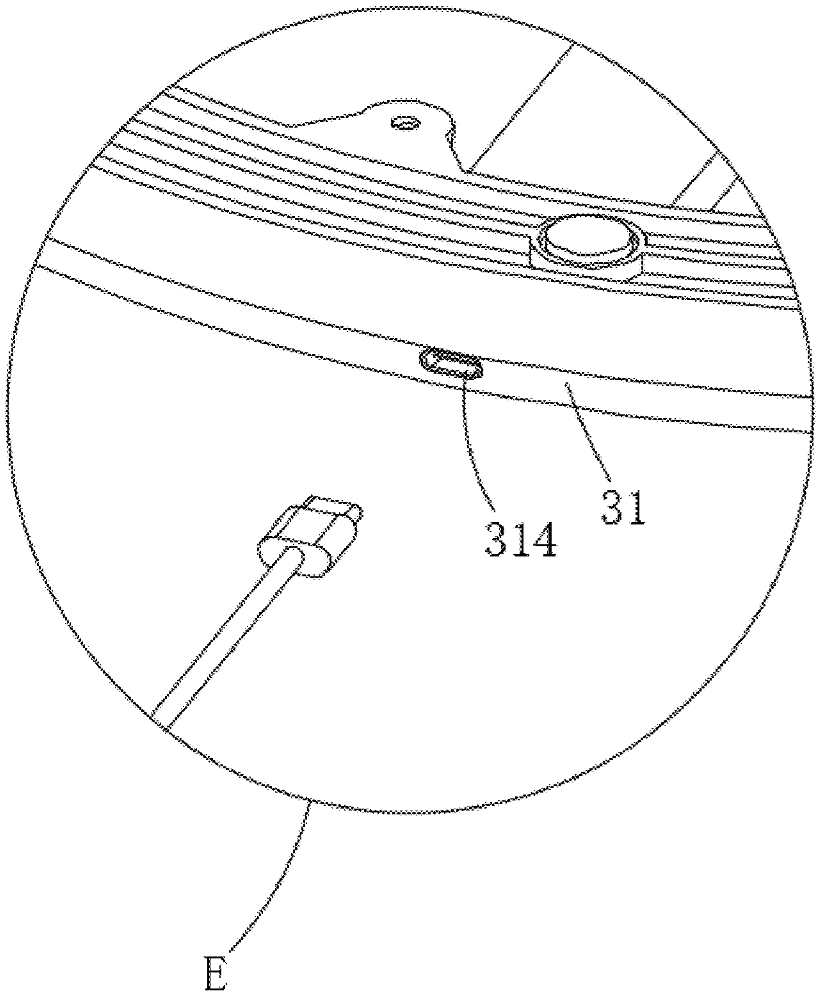
FIG. 11 is an enlarged view of a portion E shown in FIG. 9.

In an embodiment, the first wire 331 is electrically connected to the electric device 2 via a first adapter wire 333. The third circuit board 334 serves as an adapter circuit board to achieve the electrical connection between the first wire 331 and the first adapter wire 333. Two adapter ports at the two ends of the first adapter wire 333 are electrically connected to the electric device 2 and the first wire 331 respectively. One of the two adapter ports of the first adapter wire 333 is inserted into the electric device 2, and the other one of the two adapter ports of the first adapter wire 333 is inserted into the first connection port 32212. In this way, the electric device 2 is electrically connected to the first cable assembly 33 via the first connection port 32212. Further, as shown in FIG. 9 and FIG. 11, a second connection port 314 is arranged in an outer wall of the base 31. An end of the second wire 341 is electrically connected to the second connection port 314. Similarly, an external power supply source may be connected to the second connection port 314 via the adapter port of the adapter wire. In this way, power supply is achieved.

Each of the first connection port 32212 and the second connection port 314 can adopt various electrical connection interfaces, such as USB, Type-C, Lighting, and so on. Accordingly, one end of the first adapter wire 333 connected to the first connection port 32212 can adopt the same electrical connection interface as that of the first connection port 32212, and one end of the second wire 341 connected to the second connection port 314 can adopt the same electrical connection interface as that of the second connection port 314.

Further, as shown in FIG. 9, the first wire slot 322 and/or the second wire slot 312 extends through the rotation center of the rotation element 32. The electrical conductive terminal 351, the connection terminal 343, and the electrical conductive member 352 are secured in the wire slot. Therefore, the electrical conductive terminal 351, the electrical conductive member 352, and the connection terminal 343 are electrically connected at a position near the rotation center of the rotation element 32.

Figure 12:
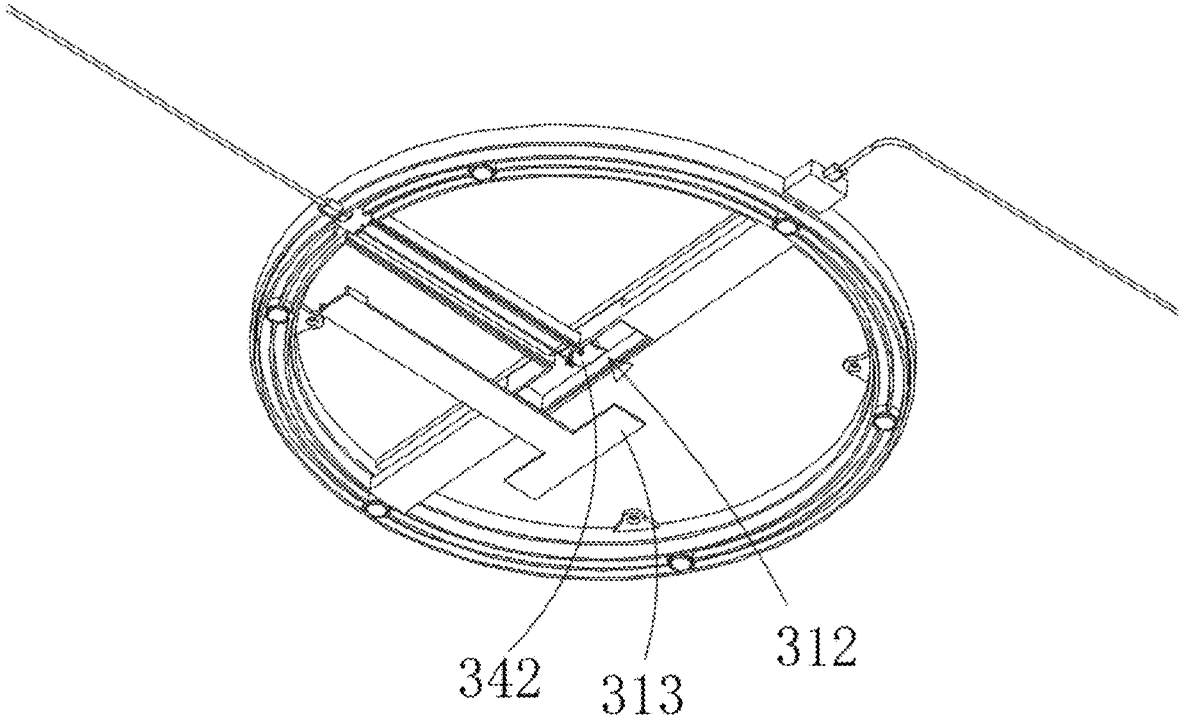
FIG. 12 is a structural schematic view of the rotation member, being viewed from another viewing angle, according to an embodiment of the present disclosure.
Figure 13:
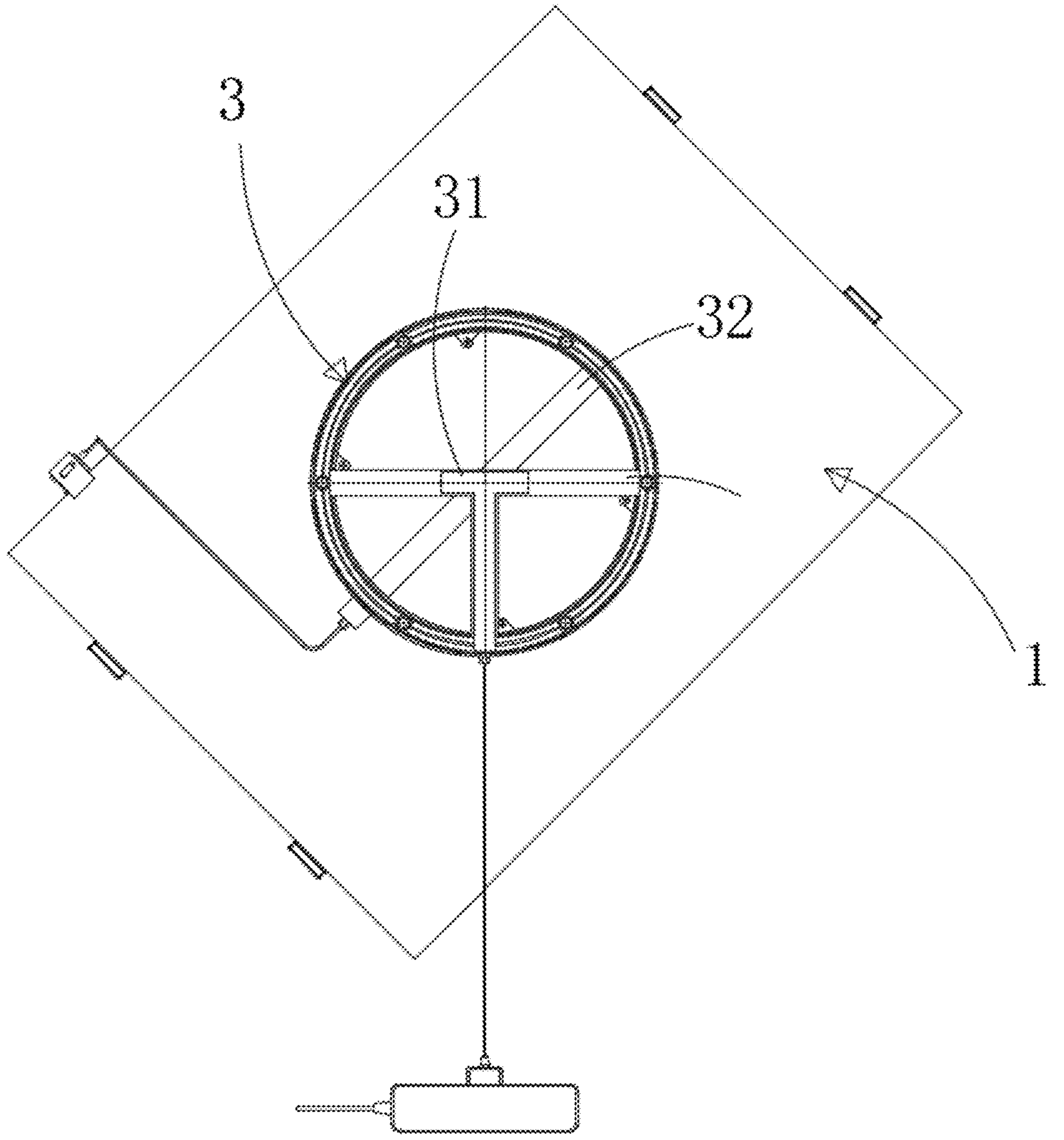
FIG. 13 is a structural schematic view of a jigsaw puzzle table, being viewed from a viewing angle, according to an embodiment of the present disclosure.

Further, as shown in FIGS. 9 and 12, the rotation element 32 or the base 31 is arranged with a cover 313. The cover 313 is configured to cover the first wire slot 322 or the second wire slot 312, so as to block external impurities, such as water or dust, from entering the wire slot. The cover 313 is connected to the wire slot by a snap, a screw, adhesive, and so on.

Further, as shown in FIG. 5, a plurality of ball bearings 30 are disposed between the rotation element 32 and the base 31. The plurality of ball bearings 30 reduce friction between the rotation element 32 and the base 31, reducing a resistance during rotation, such that the rotation is performed more smoothly.

Further, a lower surface of the base 31 is arranged with an anti-slip member configured to prevent the rotation member 3 from moving.

The anti-slip member increases friction between the base 31 and the ground, preventing the rotation member 3 from moving relative to a placement platform during rotation. The anti-slip member may be a suction disk, providing an adsorption force to enable the rotation member 3 to be tightly connected to the placement platform. Alternatively, the anti-slip member may be an anti-slip rubber pad, increasing the friction between the placement platform and the base 31.

As shown in FIG. 1 and FIGS. 13, 14, 17 and 18, the present disclosure further provides a jigsaw puzzle table, including: a table body 1; an electric device 2; and the above-described rotation member 3 connected to the table body. While in use, the table body 1 is arranged on the rotation member 3 and rotates as the rotation member 3 rotates.

The table body 1 provides a jigsaw puzzle platform for the user. The electric device 2 is configured to provide additional functions, such as emitting light or heating a desktop. When the electric device 2 is mounted on the table body 1, the electric device 2 rotates as the table body 1 and the rotation element 32 rotate. In addition, the electric device 2 may be detachably connected to a table top, and the user may use the electric device 2 separately.

Figure 14:
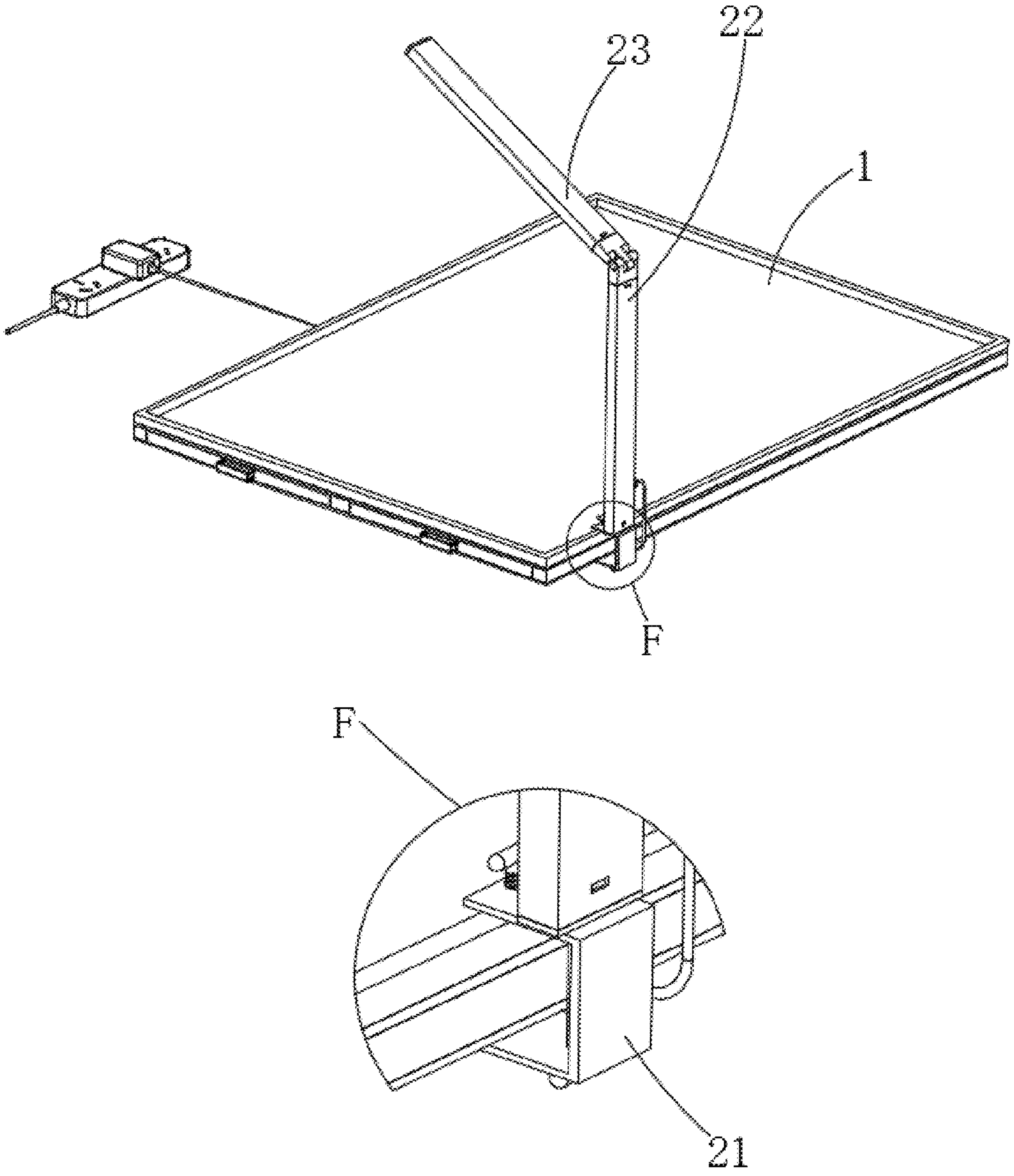
FIG. 14 is a structural schematic view of a mounting member, being viewed from a viewing angle, according to an embodiment of the present disclosure.

Further, as shown in FIG. 14, the electric device 2 includes a mounting member 21, the mounting member 21 is C-shaped and is detachably clamped to a side of the table body 1.

Specifically, the mounting member 21 has an upper edge and a lower edge. The upper edge and the lower edge may clamp the side of the table body 1 by an adhesive glue, by bolts, and so on.

In an embodiment, the mounting member 21 is fixedly connected to the electric device 2. The upper edge 211 of the mounting member 21 is fixed to the table body 1 by a first bolt, such that fixation of the electric device 2 to the table body 1 is achieved. A second bolt extends through the upper edge 211 and the lower edge 212 of the mounting member 21. During mounting, the second bolt is twisted to enable the upper edge 211 and the lower edge 212 to be bent towards each other, allowing the upper edge 211 and the lower edge 212 to tightly clamp the table body 1.

Further, the electric device 2 includes a light emitting member. The light emitting member provides a light source to the table body 1 to provide sufficient light during playing with the jigsaw puzzles to improve the usage experience.

Figure 15:
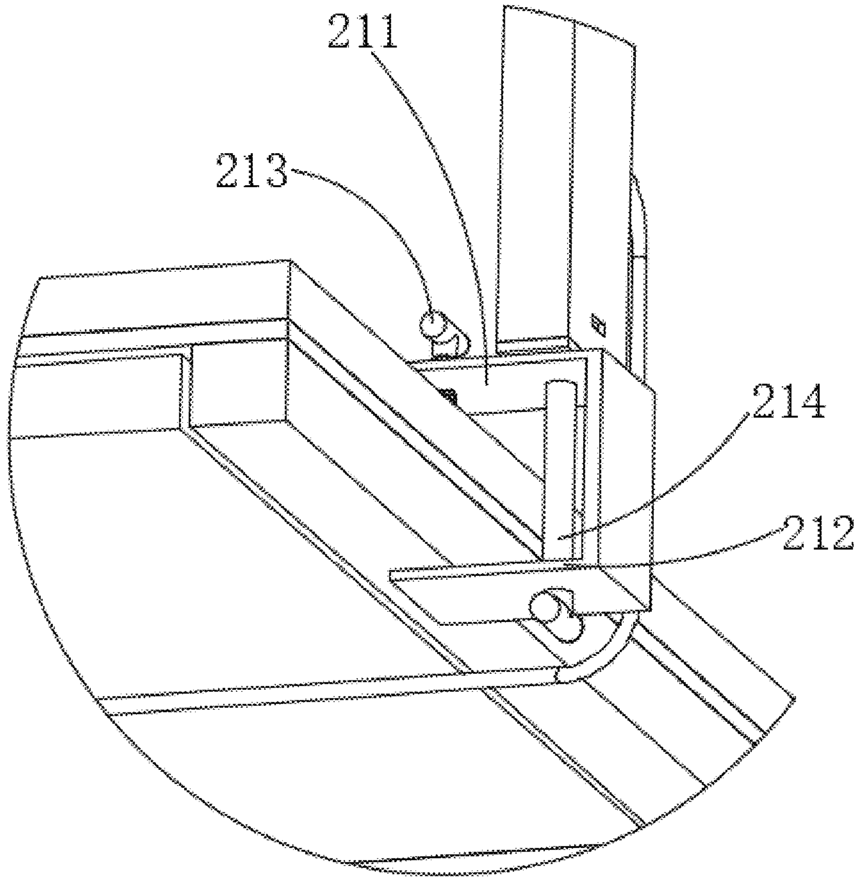
FIG. 15 is a structural schematic view of a mounting member, being viewed from another viewing angle, according to an embodiment of the present disclosure.

Further, as shown in FIG. 15, the light emitting member includes a support arm 22 and a light emitting member body 23. The light emitting member body 23 is rotatably mounted on the support arm 22 to change a direction of light emitted from the light emitting member body 23.

In an embodiment, a rotation shaft is arranged between the light emitting member body 23 and the support arm 22, allowing a light emitting direction of the light emitting member body 23 to be adjustable.

Figure 16:
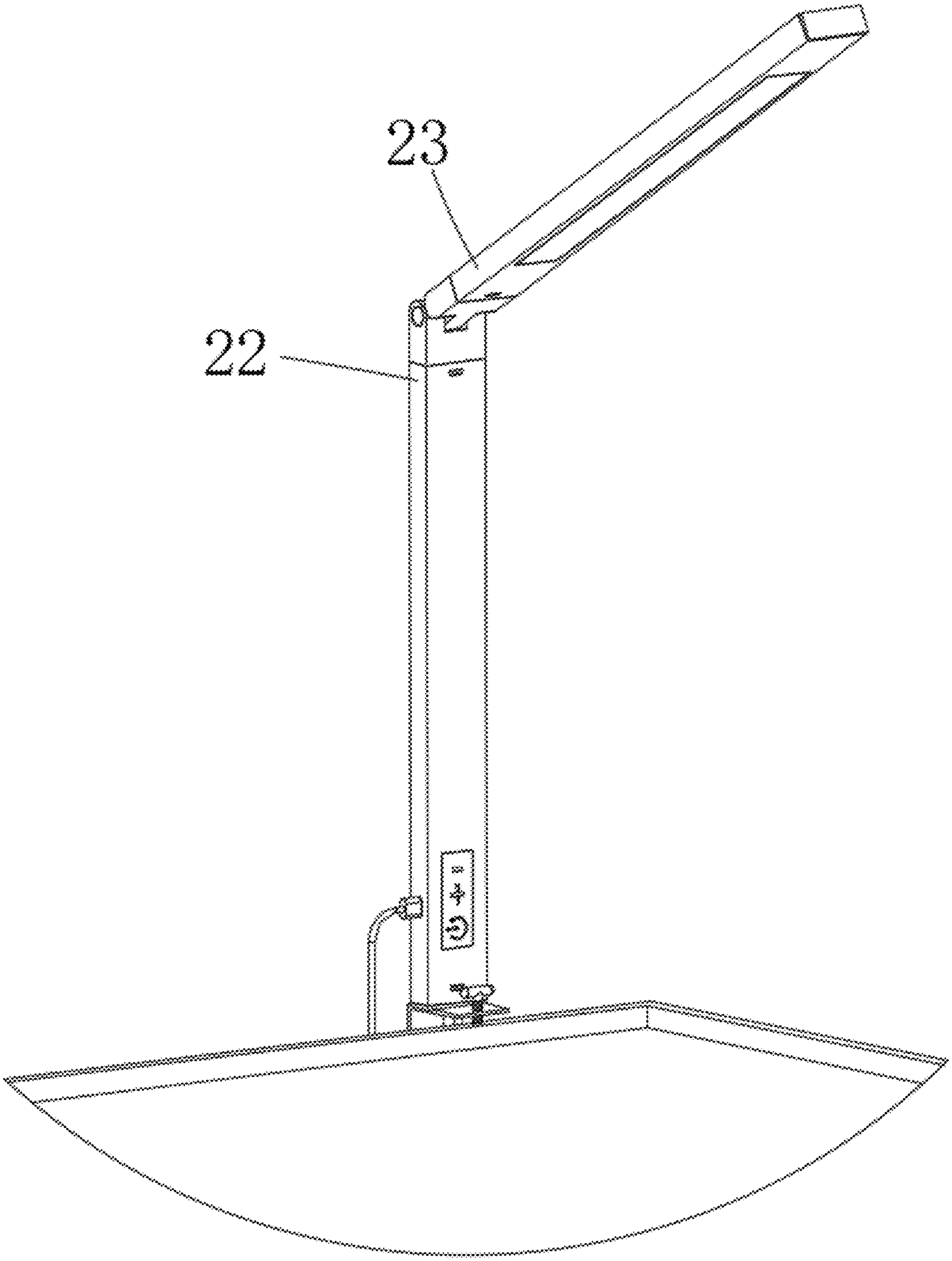
FIG. 16 is a structural schematic view of a light emitting member according to an embodiment of the present disclosure.

Further, as shown in FIG. 16, the table body 1 has a receiving space therein. The receiving space is arranged with at least one drawer 14. An opening is defined in a side of the table body 1 to allow the drawer 14 to be pulled out from the opening.

The side of the table body 1 refers to all surfaces of the table body 1 other than an upper surface and a lower surface. The user plays with the jigsaw puzzles on the upper surface of the table body 1, and the drawer 14 is configured to store scattered jigsaw puzzle pieces, jigsaw puzzle tools, and so on. Therefore, the jigsaw puzzle table is more practical. The table body 1 may be arranged with a plurality of drawers 14 to increase a storage space.

Figure 17:
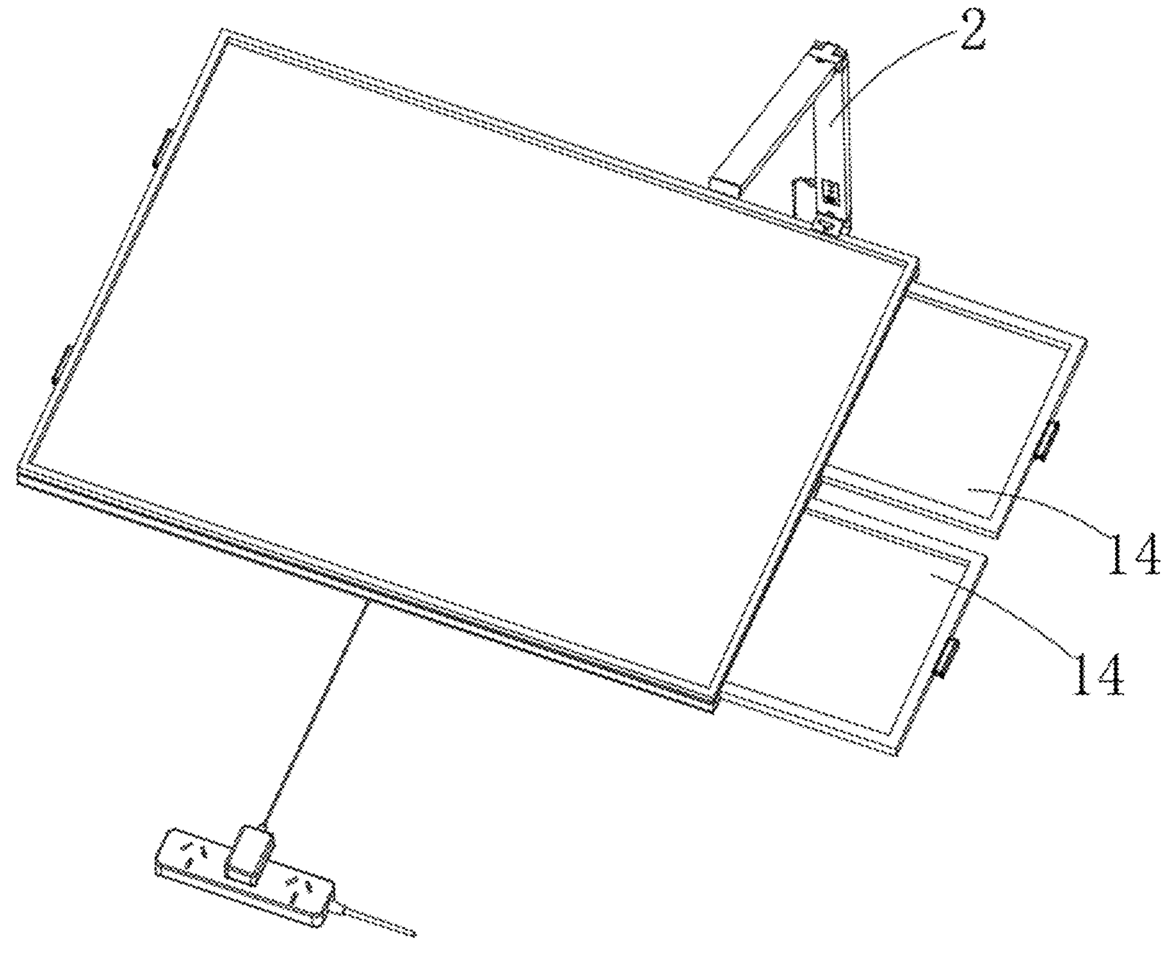
FIG. 17 is a structural schematic view of a drawer according to an embodiment of the present disclosure.
Figure 18:
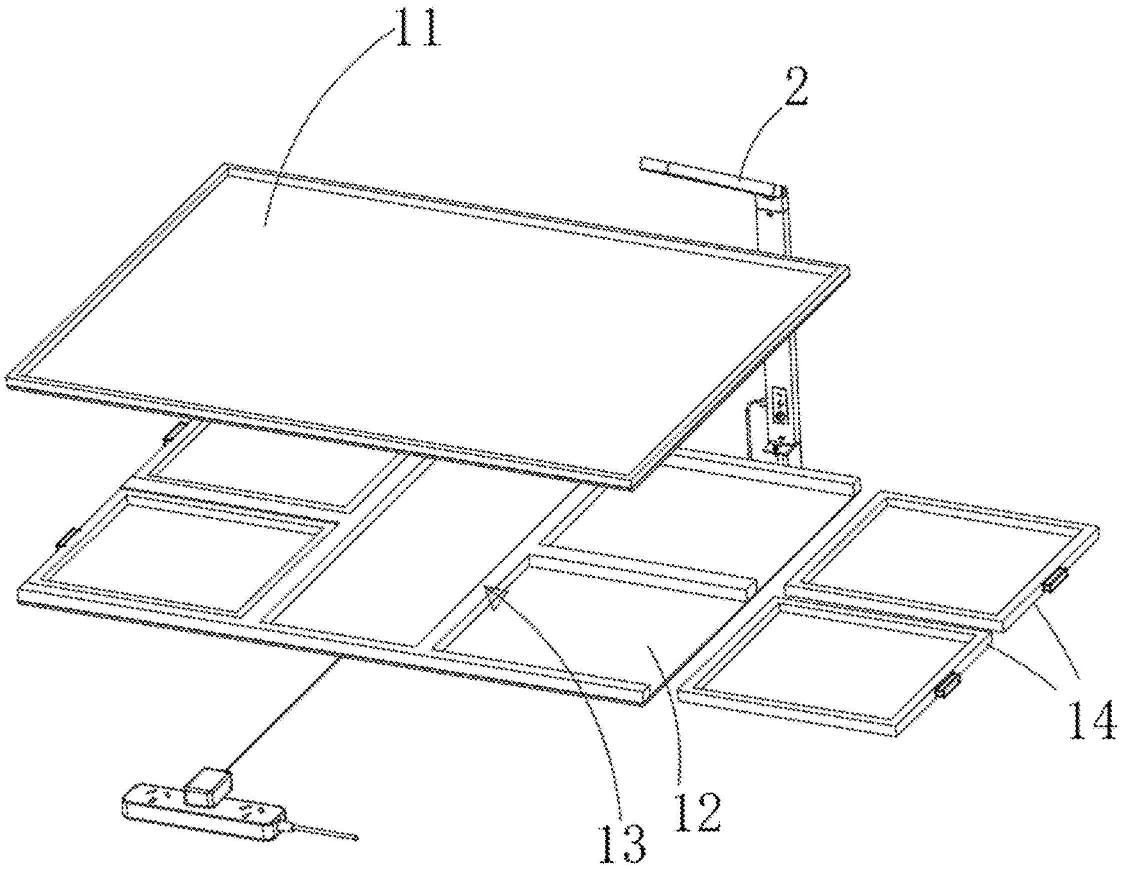
FIG. 18 is an exploded view of a table body according to an embodiment of the present disclosure.

Further, as shown in FIG. 17, the table body 1 includes an upper table plate 11, a lower table plate 12, and a frame 13 arranged in the receiving space. The base 31 is connected to the lower table plate 12, and the frame 13 is disposed at a periphery of the drawer 14 to limit a movement range of the drawer 14.

The upper table plate 11 is mounted above the frame 13, and the lower table plate 12 is mounted below the frame 13. The frame 13 provides support between the upper table plate 11 and the lower table plate 12. The frame 13 encloses a left side face, a right side face, and a rear side face of the drawer 14. In this way, the drawer 14 is limited and is able to be pulled out in a single direction, and the user is prevented from pushing the drawer excessively to an interior of the table body 1.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A rotation member prevented from being entangled, comprising:

a base and a rotation element, wherein the rotation element is rotatably mounted on the base;

a first cable assembly, a second cable assembly, and an electrical conductive assembly, wherein the first cable assembly is mounted on the rotation element to be connected to an electric device; the second cable assembly is mounted on the base to be connected to an external power supply source;

wherein the electrical conductive assembly comprises an electrical conductive terminal and an electrical conductive member electrically connected to the electrical conductive terminal; when the rotation element rotates relative to the base, the electrical conductive terminal is configured to perform a circular motion on the electrical conductive member, and a center of the circular motion coincides with a rotation center of the rotation element; the electrical conductive terminal is electrically connected to one of the first cable assembly and the second cable assembly, and the electrical conductive member is electrically connected to the other one of the first cable assembly and the second cable assembly;

wherein the rotation element defines a first wire slot, a slot bottom facing the base defines a first through hole; the electrical conductive assembly is at least partially received in the first wire slot, and the electrical conductive terminal passes through the first through hole to be exposed out of the rotation element to be electrically connected to the electrical conductive member.

2. The rotation member according to claim 1, wherein the first cable assembly comprises a first wire and a first circuit board; one of the two ends of the first wire is electrically connected to the first circuit board, the other one of the two ends of the first wire is capable of being electrically connected to the electric device; the electrical conductive terminal is electrically connected to the first circuit board.

3. The rotation member according to claim 1, wherein the second cable assembly comprises a second wire, a second circuit board, and a connection terminal; one of the two ends of the second wire is electrically connected to the second circuit board, the other one of the two ends of the second wire is capable of being electrically connected to the external power supply source; an end of the connection terminal is electrically connected to the second circuit board, and the other end of the connection terminal is electrically connected to the electrical conductive member.

4. The rotation member according to claim 2, wherein the first circuit board at least partially covers the rotation center of the rotation element.

5. The rotation member according to claim 1, wherein the electrical conductive member comprises a positive-electrode conductive member and a negative-electrode conductive member; the positive-electrode conductive member and the negative-electrode conductive member are spaced apart from each other.

6. The rotation member according to claim 5, wherein the electrical conductive terminal comprises a positive-electrode conductive terminal and a negative-electrode conductive terminal; the positive-electrode conductive terminal and the negative-electrode conductive terminal are spaced apart from each other.

7. The rotation member according to claim 1, wherein the electrical conductive terminal comprises at least two positive-electrode conductive terminals; the at least two positive-electrode conductive terminals are centrally-symmetrically distributed about the rotation center of the rotation element.

8. The rotation member according to claim 6, wherein, when the electrical conductive terminal performs the circular motion on the electrical conductive member, a trajectory of the circular motion of the positive-electrode conductive terminal and a trajectory of the circular motion of the negative-electrode conductive terminal form concentric circles.

9. The rotation member according to claim 5, wherein each of the positive-electrode conductive member and the negative-electrode conductive member is ring-shaped.

10. The rotation member according to claim 1, wherein a side of the rotation element facing the base defines the first through hole; a side of the base facing the rotation element defines a slot, and the electrical conductive member is received in the slot.

11. The rotation member according to claim 10, wherein a slot bottom of the slot defines a second through hole; a connection terminal of the second cable assembly passes through the second through hole and is electrically connected to the electrical conductive member.

12. The rotation member according to claim 2, wherein the first wire and the first circuit board are received in the first wire slot; and the base defines a second wire slot, a second wire and a second circuit board of the second cable assembly are received in the second wire slot, and the second through hole is defined in a slot wall of the second wire slot.

13. The rotation member according to claim 12, wherein the first cable assembly comprises a third circuit board, the third circuit board is electrically connected to the first wire;

an end of the first wire slot away from the rotation center defines a mounting cavity; the third circuit board is received in the mounting cavity; a first connection port is defined in an outer edge of the mounting cavity; the electrical device is electrically connected to the first cable assembly through the first connection port.

14. The rotation member according to claim 12, wherein a second connection port is arranged in an outer wall of the base; an end of the second wire is electrically connected to the second connection port.

15. The rotation member according to claim 12, wherein the first wire slot and/or the second wire slot extends through the rotation center of the rotation element.

16. The rotation member according to claim 12, wherein the rotation element or the base is arranged with a cover; the cover is configured to cover the first wire slot or the second wire slot.

17. A rotation member, comprising:

a base and a rotation element, wherein the rotation element is rotatably mounted on the base;

a first cable assembly, a second cable assembly, and an electrical conductive assembly, wherein the first cable assembly is mounted on the rotation element to be connected to an electric device; the second cable assembly is mounted on the base to be connected to an external power supply source;

wherein the electrical conductive assembly comprises an electrical conductive terminal and an electrical conductive member electrically connected to the electrical conductive terminal; when the rotation element rotates relative to the base, the electrical conductive terminal is configured to perform a circular motion on the electrical conductive member, and a center of the circular motion coincides with a rotation center of the rotation element; the electrical conductive terminal is electrically connected to one of the first cable assembly and the second cable assembly, and the electrical conductive member is electrically connected to the other one of the first cable assembly and the second cable assembly;

the rotation element defines a first wire slot extending from an edge of the rotation element to intersect with the rotation center of the rotation element;

wherein a plurality of ball bearings are arranged at a peripheral edge of the rotation element and are disposed between the rotation element and the base.

18. The rotation member according to claim 1, wherein a lower surface of the base is arranged with an anti-slip member configured to prevent the rotation member from moving.

* * * * *